US012753121B2

(12) United States Patent
Neuville et al.

(10) Patent No.: US 12,753,121 B2
(45) Date of Patent: Oct. 6, 2026

(54) LOW-CARBON CONSTRUCTION BINDER AND MATERIALS PROVIDING COMFORT IN SUMMER

(71) Applicant: MATERRUP, Saint-Geours-de-Maremne (FR)

(72) Inventors: Mathieu Neuville, Soustons (FR); Manuel Merce, Benesse Maremne (FR)

(73) Assignee: MATERRUP, Saint-Geours-de-Maremne (FR)

( * ) Notice: Subject to any disclaimer, the term of this patent is extended or adjusted under 35 U.S.C. 154(b) by 323 days.

(21) Appl. No.: 18/272,065

(22) PCT Filed: Jan. 19, 2022

(86) PCT No.: PCT/EP2022/051157
§ 371 (c)(1),
(2) Date: Jul. 18, 2023

(87) PCT Pub. No.: WO2022/157209
PCT Pub. Date: Jul. 28, 2022

(65) Prior Publication Data

US 2024/0076238 A1 Mar. 7, 2024

(30) Foreign Application Priority Data

Jan. 19, 2021 (EP) .................................... 21305065
May 12, 2021 (EP) .................................... 21305629

(51) Int. Cl.
*C04B 28/04* (2006.01)
*C04B 103/00* (2006.01)
(Continued)

(52) U.S. Cl.
CPC ...... *C04B 28/04* (2013.01); *C04B 2103/0081* (2013.01); *C04B 2103/10* (2013.01); *C04B 2111/00017* (2013.01)

(58) Field of Classification Search
CPC ........... C04B 28/04; C04B 2103/0081; C04B 2103/10; C04B 2111/00017;
(Continued)

(56) References Cited

U.S. PATENT DOCUMENTS

2018/0111878 A1 4/2018 Hoffmann

FOREIGN PATENT DOCUMENTS

CN 107646025 A 1/2018
EP 2289857 A2 3/2011
(Continued)

OTHER PUBLICATIONS

International Search Report and Written Opinion for PCT/EP2022/051157, dated May 10, 2022 (including machine-translation of Written Opinion), 17 pages.
(Continued)

*Primary Examiner* — Taiwo Oladapo
(74) *Attorney, Agent, or Firm* — Tucker Ellis LLP

(57) ABSTRACT

The invention relates to a method (100) for producing a prefabrication element and to a construction binder including a raw clay matrix, a deflocculation agent and an activation composition, wherein:

- the raw clay matrix includes at least one raw clay from the smectite family;
- the at least one raw clay from the smectite family represents at least 20% by weight of the construction binder; and
- the construction binder comprises less than 15% by weight of Portland cement.

18 Claims, 1 Drawing Sheet

(51) Int. Cl.
*C04B 103/10* (2006.01)
*C04B 111/00* (2006.01)

(58) Field of Classification Search
CPC ......... C04B 2111/00025; C04B 28/001; C04B 14/042; C04B 7/02; C04B 14/104; C04B 14/106
See application file for complete search history.

(56) References Cited

FOREIGN PATENT DOCUMENTS

| | | | | |
|---|---|---|---|---|
| FR | 3084357 | | 1/2020 | |
| FR | 3084357 | A1 * | 1/2020 | ............. C04B 28/06 |
| WO | 2020141285 | | 7/2020 | |
| WO | 2020178538 | | 9/2020 | |

OTHER PUBLICATIONS

Al Haffar Noha, et al. "Curing conditions impact on compressive strength development in cement stabilized compacted earth". Materials and Structures, Springer Netherlands, Dordrecht. vol. 54, No. 3, Apr. 19, 2021.
English translation of Office Action issued in counterpart application CN 202280021841.3 Dated Jul. 17, 2025.

* cited by examiner

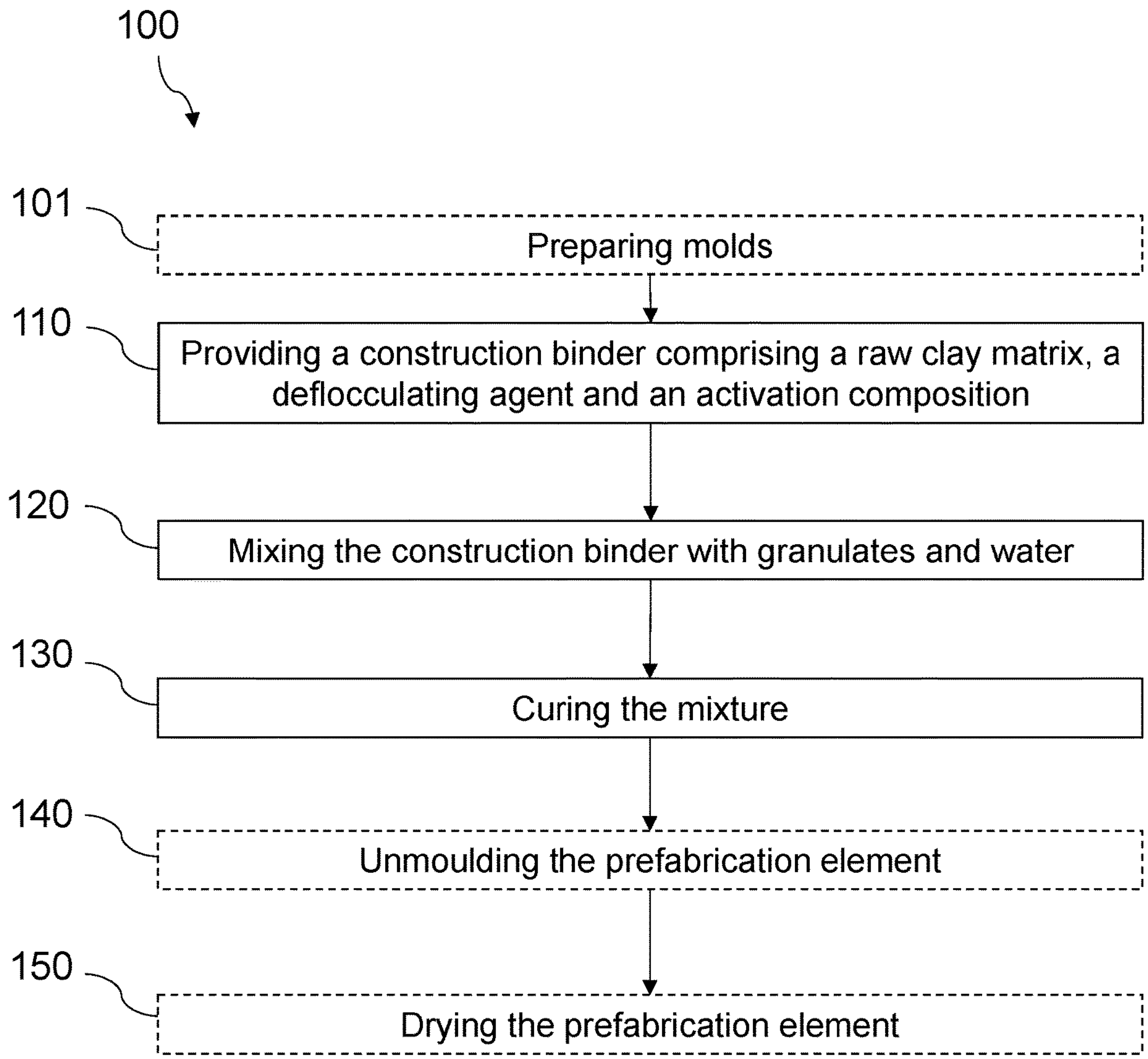
100
101
Preparing molds
110
Providing a construction binder comprising a raw clay matrix, a deflocculating agent and an activation composition
120
Mixing the construction binder with granulates and water
130
Curing the mixture
140
Unmoulding the prefabrication element
150
Drying the prefabrication element

LOW-CARBON CONSTRUCTION BINDER AND MATERIALS PROVIDING COMFORT IN SUMMER

The invention relates to the field of construction materials, and more particularly to that of binders which can be used in construction. The invention relates to a formulation for a construction binder. The invention also relates to a method for preparing a construction binder, the construction binder as such and the use of such a binder in the production of construction materials. The construction materials thus obtained, also subject of the invention, provide summer comfort (for example passive regulation of hygrothermy) to the buildings which incorporate them.

PRIOR ART

Cement is the second most consumed resource in the world, with more than 4 billion tons of materials produced each year in the world and this consumption is constantly increasing driven by the growing demand for housing and infrastructure.

Cement is a generally hydraulic binder which, mixed with water, hardens and solidifies. After hardening, the cement retains its strength and stability even when exposed to water. There are a wide variety of cements used by the world. However, all conventional cements include a clinker at a percentage ranging from 5% for certain blast furnace cements to a minimum of 95% for Portland cement, which is the most used cement in the world today.

Clinker results from the firing of a mixture composed of approximately 80% limestone and 20% aluminosilicates (such as clays). This firing, the clinkerization, is generally done at a temperature of more than 1200° C., such a cement preparation process therefore involves high energy consumption. Additionally, the chemical conversion of limestone into lime also releases carbon dioxide. As a result, the cement industry generates around 8% of global $CO_2$ emissions. Faced with this challenge, the industry and researchers are studying the possibilities of reducing the impact of carbon dioxide emissions generated by the cement industry.

In order to reduce the carbon dioxide emissions associated with the field of construction, new low-carbon construction binder formulations including a raw clay matrix and a deflocculation agent (WO2020141285) have been proposed. However, this document mainly describes the use of compositions allowing to reduce the emission of carbon dioxide for construction materials while having high mechanical strengths. A method has also been proposed for selecting the composition of a construction material including an excavated clay soil (WO2020178538) or else a binder comprising at least one raw clay allowing to achieve the required performance in terms of adhesion by traction for tile adhesives (FR3084357).

In addition to reducing carbon dioxide emissions, consumers could benefit from substitutes for Portland cement having hygrothermal properties capable of providing comfort to inhabitants during hot periods.

The massive use of air conditioning, heating devices or else air recyclers or ventilation in buildings, to control the temperature or the humidity level, also generates substantial $CO_2$ emissions (both for their manufacture and throughout their use). On the contrary, the passive control of the temperature or the humidity level does not by definition consume any energy and does not require any human supervision. Therefore, it represents a more resilient and sustainable option in many situations where the energy consumption of thermal, hygrometric or more generally ventilation regulation systems can be reduced.

However, this aspect is not currently explored by the construction industry and the rare materials recognized as having hygrothermal properties that can provide comfort in summer are construction materials that are not very industrialized and based on biosourced products such as wood (chips, fibers) hemp (hemp shives), straw or else geosourced materials such as earth-based materials (rammed earth, clay bricks, cob, . . . ).

In particular, the use of hemp for the production of mortar, coating, prefabricated hemp concrete elements allows optimal humidity regulation in addition to having very satisfactory insulating properties and its production has a very interesting carbon balance. On the other hand, biosourced construction materials very often have relatively weak mechanical properties, which limits their use to insulation, cladding or the formation of wall partitions subject to little mechanical stress. Furthermore, the drying times, for example of hemp concrete, are relatively long (for example greater than 5 days) which further limits their use.

Thus, there is a need for new formulations of fast-setting construction binders having on the one hand a low carbon footprint and mechanical properties of concretes at least equivalent or even superior to the mechanical properties of concretes derived from cements commonly used in the construction field (such as cements CEM I, CEM II, CEM III, CEM IV and CEM V defined by standard NF EN 197-1) and on the other hand allowing passive regulation of the temperature and humidity of a building incorporating such a construction binder.

Technical Problem

The object of the invention is to overcome the disadvantages of the prior art. In particular, the object of the invention is to propose a construction binder allowing to obtain a construction material capable of thermal and moisture regulation while retaining mechanical properties adapted to the constraints of modern constructions. Furthermore, the object of the invention is to provide, for certain applications, such a material which is also provided with fast setting.

Furthermore, the object of the invention is to provide a method for manufacturing a construction binder that allows to reduce the emission of greenhouse gases, such as the carbon dioxide emitted during the preparation of such a construction material, while preserving the appropriate mechanical characteristics of said material and giving it hygrothermal regulation properties.

BRIEF DESCRIPTION OF THE INVENTION

To this end, the inventors have developed several solutions allowing to respond to the disadvantages of the prior art. The preferred solution is detailed below.

The invention relates in particular to a construction binder including a raw clay matrix, a deflocculation agent and an activation composition, characterized in that:

- the raw clay matrix includes at least one raw clay from the smectite family;
- the at least one raw clay from the smectite family represents at least 20% by weight of the construction binder; and
- the construction binder comprises less than 15% by weight of Portland cement.

In particular, the invention relates to a construction binder including a raw clay matrix, a deflocculation agent and an alkaline activation composition, characterized in that:

it comprises from 2% to 40% by dry weight of the alkaline activation composition;

it comprises at least 40% by weight of raw clay matrix and the raw clay matrix includes at least one raw clay from the smectite family; the at least one raw clay from the smectite family represents at least 20% by weight of the construction binder; and the construction binder comprises less than 15% by weight of Portland cement.

As will be presented in the examples, a construction binder according to the present invention provides moisture buffering capacities capable of improving the comfort of the inhabitants by thermal and moisture regulation. Furthermore, thanks to its mechanical properties combined with these properties of thermal and moisture regulation, the construction binder according to the invention is intended to replace, totally or in part, Portland cement. Indeed, the inventors have shown that the presence, at least at a given concentration, of smectite in a construction binder according to the invention allows to achieve very good moisture buffering capacity values which are not achievable under these conditions with other raw clays alone such as kaolinite.

Furthermore, as will be shown below, the construction binder allows to achieve mechanical performance identical to Portland cement (for example class C12/15; C20/25 or C25/30) while reducing by 30 to 85% the greenhouse gas emissions, and by providing comfort to residents through thermal and moisture regulation. Furthermore, it comprises little or no Portland cement. Indeed, as illustrated in the examples, the presence of Portland cement leads to a reduction in the moisture buffer value.

According to other optional characteristics of the construction binder, the latter may optionally include one or more of the following characteristics, alone or in combination:

The raw clay matrix includes a mixture of at least two types of clays. Preferably, the raw clay matrix includes at least one raw clay from the smectite family and at least one other clay selected from: Illite; Kaolinite; Vermiculite; Chlorite; Muscovite; Halloysite; Sepiolite or Attapulgite. Indeed, as shown in the examples, a combination of clay allows to obtain better results in terms of moisture buffering capacity and mechanical resistance.

The raw clay matrix includes at least one clay having a specific surface at least equal to 100 $m^2/g$, for example as measured according to standard NFP 94-068, a specific surface at least equal to 150 $m^2/g$; a specific surface at least equal to 200 $m^2/g$; or a specific surface at least equal to 250 $m^2/g$. More preferably, the raw clay matrix includes at least two clays having a specific surface at least equal to 100 $m^2/g$, a specific surface at least equal to 150 $m^2/g$; a specific surface at least equal to 200 $m^2/g$; or a specific surface at least equal to 250 $m^2/g$. Preferably, the specific surface can be measured using the protocols described in the standards NFP 94-068, or NF EN 933-9+A1 or ISO 9277:2010. More preferably, the construction binder will include at least 20% by weight of a clay having such specific surfaces, even more preferably less than 40% by weight.

It comprises at least 10% by weight of raw clay matrix, preferably at least 30%, more preferably at least 40% by weight. Indeed, as will be shown in the examples, from at least 40% by weight of raw clay matrix, the construction binder allows the preparation of construction materials having moisture buffering capacities (MBV) greater than or equal to 1.3. For example, the raw clay matrix can be present from 40% to 70%, preferably from 40% to 60% by weight of the construction binder.

it further includes a calcined metal oxide composition; preferably the calcined metal oxide composition being a blast furnace slag. Indeed, as shown in the examples, a calcined metal oxide composition allows to increase the mechanical strength without influencing the MBV, unlike Portland cement. Preferably, the construction binder includes at least 20% by weight of the calcined metal oxide composition. Furthermore, more preferably it has a mass ratio of the raw clay matrix to the calcined metal oxide composition greater than or equal to 1.

The activation composition includes at least 40% by weight of at least one metal oxide corresponding to the oxide of a metal having at least two valence electrons. The activation composition may in particular include at least 50% by weight of a metal oxide corresponding to the oxide of a metal having at least two valence electrons. The presence of such a metal oxide at these concentrations in the activation composition allows to increase the moisture buffering capacity value.

the construction binder includes at least 10% by weight of at least one metal oxide corresponding to the oxide of a metal having at least two valence electrons. Preferably, the at least 10% by weight may correspond to several different metal oxides. The metal oxides formed with a metal having at least two valence electrons may come from several sources. Preferably, these metal oxides will be contained in the activation composition and/or in the calcined metal oxide composition. Preferably, the construction binder includes at least 15% by weight of at least one metal oxide corresponding to the oxide of a metal having at least two valence electrons, more preferably at least 20% by weight; even more preferably at least 25% by weight, for example at least 30% by weight. The construction binder may include less than 50% by weight of at least one metal oxide corresponding to the oxide of a metal having at least two valence electrons. For example, the construction binder may include between 15% by weight and 40% by weight of at least one metal oxide corresponding to the oxide of a metal having at least two valence electrons.

the construction binder combined with water and granulates has a moisture buffer value, measured no earlier than 10 days after manufacture and preferably 28 days, greater than or equal to 0.75, preferably greater than or equal to 1, more preferably greater than or equal to 1.2 and even more preferably greater than or equal to 1.5.

The deflocculation agent is an organic compound. Preferably, the deflocculation agent comprises a lignosulfonate, a polyacrylate, a humate or a mixture thereof.

It comprises excavated earth including at least a portion of the raw clay matrix. The excavated earth can then be considered as excavated clay soil.

It further includes a composition of at least 20% by weight of calcined aluminosilicates or in that the composition of metal oxides includes at least 20% of aluminosilicates.

According to another aspect, the invention relates to a construction material capable of being formed from a construction binder according to the invention, including:

at least 2% by weight of at least one raw clay from the smectite family, less than 3.75% by weight of Portland cement, and having a moisture buffer value measured no earlier than 10 days after manufacture greater than or equal to 0.75; preferably greater than or equal to 1. The moisture buffer value can be measured according to the methodology for measuring MBV values as described in the description.

According to certain aspects, the invention also relates to a construction material formed from a construction binder according to the invention, including at least 2% by weight of at least one raw clay from the smectite family, and less than 3.75% by weight of Portland cement.

According to other optional characteristics of the construction material, the latter may optionally include one or more of the following characteristics, alone or in combination:

it includes at least 2% by weight of a calcined metal oxide composition.

It preferably includes less than 2% of Portland cement, more preferably less than 0.1%, even more preferably it does not include Portland cement It includes at least two raw clays.

It includes at least 5% by weight of at least one metal oxide corresponding to the oxide of a metal having at least two valence electrons.

It has a minimum compressive strength on cylinders at 1 day as measured by standard NF EN 206-1 greater than or equal to 2 MPa. For example, it may have a minimum compressive strength on cylinders at 28 days as measured by standard NF EN 206-1 greater than or equal to 2 MPa. Furthermore, it may have a minimum compressive strength on cylinders after 28 days as measured by standard NF EN 206-1 of less than or equal to 20 MPa.

According to another aspect, the invention relates to a prefabricated element capable of being formed from a construction binder according to the invention, said prefabricated element:

having a face with a surface area of at least 1 $m^2$ and a thickness comprised between 0.3 cm and 20 cm;

including at least 5% by weight of at least one raw clay from the smectite family, including less than 3.75% by weight of Portland cement and having a moisture buffer value, measured no earlier than 10 days after manufacture, greater than or equal to 0.75. The moisture buffer value can be measured according to the methodology for measuring MBV values as described in the description.

According to certain aspects, the invention also relates to a prefabricated element formed from a construction binder according to the invention, having a face with a surface area of at least 1 $m^2$ and preferably a thickness comprised between 0.3 cm and 20 cm; including at least 5% by weight of at least one raw clay of the smectite family, and including less than 3.75% by weight of Portland cement.

According to other optional characteristics of the prefabricated element, the latter includes at least 2% by weight of a calcined metal oxide composition.

According to another aspect, the invention relates to a method for preparing a construction material comprising the following steps:

Providing a construction binder comprising a raw clay matrix including at least one raw clay from the smectite family, a deflocculation agent and an activation composition; the at least one raw clay from the smectite family represents at least 20% by weight of the construction binder; and the construction binder comprising less than 15% by weight of Portland cement, Adding water and granulates, and Mixing so as to obtain a construction material.

According to another aspect, the invention relates to a method for producing a prefabrication element prepared from a construction binder, said construction binder including a raw clay matrix, an activation composition and a deflocculation agent, said method comprising:

Providing a construction binder comprising a raw clay matrix including at least one raw clay from the smectite family, a deflocculation agent and an activation composition; the at least one raw clay from the smectite family represents at least 20% by weight of the construction binder; and the construction binder comprising less than 15% by weight of Portland cement.

Mixing the construction binder with granulates and water, and

Carrying out a step of curing the mixture, said curing step including a heat treatment of the mixture, preferably at a temperature less than or equal to 100° C., for a duration comprised between 2 hours and 23 hours.

In particular, the invention relates to a method for producing a prefabrication element prepared from a construction binder, said construction binder including a raw clay matrix, an alkaline activation composition and a deflocculation agent, said method comprising:

Providing a construction binder comprising a raw clay matrix including at least one raw clay from the smectite family, a deflocculation agent and an alkaline activation composition; the construction binder comprising from 2% to 40% by dry weight of the alkaline activation composition; the at least one raw clay from the smectite family represents at least 20% by weight of the construction binder; and the construction binder comprising less than 15% by weight of Portland cement, Mixing the construction binder with granulates and water, and Carrying out a step of curing the mixture, said curing step including a heat treatment of the mixture, preferably at a temperature less than or equal to 100° C., for a duration comprised between 2 hours and 23 hours.

The mixing of the construction binder with granulates and water allows to obtain a construction material. Such methods allow to generate construction materials having a low carbon footprint as well as moisture buffering capacities capable of improving the comfort of the inhabitants by thermal and moisture regulation.

Furthermore, the use of a curing step allows fast setting suitable for the manufacture of prefabrication elements.

Furthermore, in embodiments, these prefabrication elements may have, after curing times of twenty-three hours or less, mechanical properties of concretes at least equivalent or even superior to the mechanical properties of concretes derived from cements commonly used in the construction field.

Furthermore, certain formulations allow to obtain a construction material capable of fast setting, which is necessary for certain construction modes.

Thus, according to another aspect, the invention relates to a construction material formed or likely to be formed from a construction binder according to the invention.

According to other optional characteristics of the construction material, the latter may optionally include one or more of the following characteristics, alone or in combination:

It will include at least 2% by weight of at least one raw clay from the smectite family, for example at least 5% by weight; preferably at least 8% by weight, more preferably at least 10% by weight. Indeed, it was shown that the presence of smectite or a similar clay improves the moisture buffering capacity.

It will include less than 3.75% by weight of Portland cement.

It will include at least two raw clays. Indeed, it was shown that the presence of a combination of clays allows to improve the moisture buffering capacity and the mechanical resistance.

It will also include at least 5% by weight of at least one metal oxide corresponding to the oxide of a metal having at least two valence electrons, preferably at least 10% by weight of at least one metal oxide corresponding to the oxide of a metal having at least two valence electrons. This improves moisture buffering capacity and mechanical strength.

It comprises diatom frustules or plant fibers, preferably hemp shives.

It has a moisture buffer value greater than or equal to 0.75, preferably greater than or equal to 1, preferably measured no earlier than 10 days after manufacture.

It has a minimum compressive strength on cylinders at 1 day as measured by standard NF EN 206-1 greater than or equal to 2 MPa, preferably greater than or equal to 3 MPa, preferably greater than 5 MPa. Advantageously, the construction material has a minimum resistance to compression on cylinders at 7 days as measured by standard NF EN 206-1 greater than or equal to 8 MPa, preferably greater than or equal to 10 MPa.

Thus, according to another aspect, the invention relates to a prefabricated element capable of being formed from a construction binder according to the invention and having a face with an area of at least 1 $m^2$ and a thickness comprised between 0.3 cm and 20 cm.

Such a prefabricated element advantageously has a moisture buffer value measured at 10 days greater than or equal to 0.75, preferably greater than or equal to 1, more preferably greater than or equal to 1.2 and even more preferably greater than or equal to equal to 1.5.

Such a prefabricated element advantageously comprises less than 3.75% by weight of Portland cement.

Such a prefabricated element advantageously includes at least 5% by weight of at least one raw clay from the smectite family.

Such a prefabricated element will be particularly suitable for use inside habitats. Indeed, a large exchange surface, combined with a high moisture buffer value will allow better regulation. Furthermore, the thickness can be selected according to the desired level of regulation.

Other advantages and characteristics of the invention will appear upon reading the following description given by way of illustrative and non-limiting example, with reference to the appended FIG. 1 representing a diagram of a method for producing a prefabricated element prepared from a construction binder according to the invention.

DETAILED DESCRIPTION

In the rest of the description, the term "% by weight" in connection with the raw clay matrix, the binder or the construction material must be understood as being a proportion relative to the dry weight of the binder or the construction material. The dry weight corresponds to the weight before the addition of water, for example, necessary for the formation of a construction material.

The term "Dehydrated" within the meaning of the invention corresponds to a formulation including a reduced amount of water and for example a water content of less than 20% by weight, preferably less than 10%, more preferably less than 5%, more preferably less than 2% and for example less than 1% by weight. The water content can be measured by any known method of the prior art. It can for example be measured according to the standard NF P 94 050 of September 1995 "Determination of the water content by weight of materials: Steaming method".

The term "clay matrix" means one or more rocky materials based on silicates and/or aluminosilicates of lamellar structure, said clay matrix being composed of fine particles generally originating from the alteration of three-dimensional framework silicates, such as the feldspars. A clay matrix may thus include a mixture of such rocky materials which may for example consist of kaolinite, illite, smectite, bentonite, chlorite, vermiculite, metakaolin or mixtures thereof. The expression "raw clay matrix" corresponds within the meaning of the invention to a clay matrix that has not undergone a calcination step. In particular, that is to say that it has not undergone any prior heat treatment. For example, this corresponds to a clay matrix that has not undergone a temperature rise above 300° C., preferably above 200° C. and more preferably a temperature above 150° C. Indeed, the raw clay matrix can undergo a drying step requiring a rise in temperature generally substantially equal to or less than 150° C., but no calcination step. A raw clay matrix may preferably include a mixture of rocky materials which may for example consist of kaolinite, illite, smectite, bentonite, chlorite, vermiculite, or mixtures thereof.

Within the meaning of the invention, a "deflocculating agent" or "deflocculation agent" may correspond to a compound which, in aqueous suspension, will dissociate aggregates and colloids. Deflocculating agents have, for example, been used in the context of drilling or oil extraction to make the clay more fluid and to facilitate extraction or drilling.

Within the meaning of the invention, "activation composition" can correspond to a composition having the function of accelerating the formation of a compact structure, thus increasing the mechanical strength of the materials incorporating such an activation composition. In particular, an "alkaline activation composition" includes at least one base, such as a weak base or a strong base.

The expression "composition of metal oxides" may refer within the meaning of the invention to a composition including metal oxides such as aluminates. In particular, the composition of metal oxides includes more than 25% by weight of metal oxides, preferably more than 30% by weight of metal oxides, more preferably more than 40% by weight of metal oxides and even more preferably more than 45% by weight of metal oxides. For example, the metal oxide composition includes more than 2% by weight of aluminate, preferably more than 5% by weight of aluminate, more preferably more than 7% by weight of aluminate and even more preferably more than 10% by weight of aluminate. Furthermore, the metal oxides can correspond to, or include, alkaline earth metal oxides. For example, the metal oxide composition may include more than 10% by weight calcium oxide, preferably more than 20% by weight calcium oxide, more preferably more than 25% by weight calcium oxide and even more preferably more than 30% by dry weight of calcium oxide.

The metal oxide composition may include chemical species that are not metal oxides. For example, the metal oxide composition may include metalloid oxides with, for example, more than 10% by weight of metalloid oxide, preferably more than 20% by weight of metalloid oxide, more preferably more than 25% by weight of metalloid oxide and even more preferably more than 30% by weight of metalloid oxide. These mass concentrations can easily be measured by the person skilled in the art using conventional techniques for assaying metal oxides or metalloid oxides.

In particular, the expression "composition of metal oxides" refers to a composition including more than 50%, preferably more than 70%, more preferably more than 80% and even more preferably more than 90% of metal oxides and/or metalloid oxides, including aluminates. Preferably, a composition of metal oxides will correspond to a slag from metallurgy, such as a blast furnace slag or else fly ash.

As will be detailed below, the "composition of metal oxides" is a calcined metal oxide composition. That is to say, it has undergone a high temperature step. This high temperature step can be natural or artificial, in this case it is a high temperature treatment. The high temperature step can for example correspond to a treatment at a temperature greater than or equal to 500° C., preferably greater than or equal to 750° C. and more preferably greater than or equal to 900° C.; and even more preferably greater than 1000° C.

The term "binder" or "construction binder" within the meaning of the invention can be understood as a formulation allowing to ensure the agglomeration of materials together, in particular during the setting, then the hardening of a construction material. Thus, it allows in particular to ensure the agglomeration of the sand and other granulates with the constituents of the binder. The binder according to the invention is in particular a hydraulic binder, that is to say that the hardening takes place in contact with water.

The expression "Portland cement" corresponds to a hydraulic binder composed mainly of hydraulic calcium silicates, the setting and hardening of which is made possible by a chemical reaction with water. Portland cement generally contains at least 95% clinker and at most 5% secondary constituents such as alkalis ($Na_2O$, $K_2O$), magnesia ($MgO$), gypsum ($CaSO_4$, $2H_2O$) or various trace metals.

A "construction material" within the meaning of the invention generally corresponds to elements including the constituents of the binder as well as granulates and other additives. In particular, a construction material within the meaning of the invention meets the criteria of standard NF EN 206-1. It can take different forms such as mortar, concrete or prefabricated elements such as concrete blocks. A "fast-setting construction material" may in particular be in the form of a construction material which, 24 hours after the addition of water, has a minimum resistance to compression on cylinders as measured by standard NF EN 206-1 greater than or equal to 2 MPa; preferably greater than or equal to 3 MPa; more preferably greater than or equal to 5 MPa.

The expression "air entrainer" corresponds to an adjuvant intended to be incorporated into a construction binder according to the invention and whose main function is to generate porosities of homogeneous size within the construction binder once the setting of the latter is finished. Such an adjuvant can for example correspond to surfactants such as alkyl-ether sulfates.

The expression "moisture buffer value" or "MBV", represents the capacity of a material to exchange humidity with its environment. It allows to estimate the dynamic hygrothermal behavior of the material in question and is used to determine the thermal comfort in the field of construction and more particularly the regulation of the interior humidity of a room or a building. The MBV is expressed in g/m$^2$. % RH and indicates the average amount of water which is exchanged by sorption or desorption when the surfaces of the material are subjected to variations in relative humidity (RH) over a given time.

The moisture buffer value can be measured by any method known to the person skilled in the art. For example, the person skilled in the art may refer to the method described in "Durability and hygroscopic behaviour of biopolymer stabilised earthen construction materials" Construction and Building materials 259 (2020). In particular, the samples may be placed in a climatic chamber at 23° C. and 33% relative humidity and are left until they have a constant mass (for example a model climatic chamber MHE 612). Under these conditions, the samples are equilibrated after 15 days of storage. The samples are then exposed to cycles of high humidity (75% RH for 8 h) then a cycle of low relative humidity (33% RH for 16 h). The samples are weighed at regular intervals with an accurate laboratory scale to 0.01 g. After two stable cycles, the samples left the climatic chamber.

$$MBV = \frac{\Delta m}{S \times \Delta\ \%\ RH}$$

where Δm is the change in mass of the sample due to the change in relative humidity, S is the total exposure area, and Δ% RH is the difference between the humidity levels.

The term "substantially equal" within the meaning of the invention corresponds to a value varying by less than 20% with respect to the compared value, preferably by less than 10%, even more preferably by less than 5%.

The expression "prefabrication element" or "prefabricated elements" within the meaning of the invention may correspond to construction elements which have undergone a curing step such as elements of the concrete block type which can be combined in a modular way to make a building. These prefabrication elements may include a reinforcement (for example: beams, panels, stairs) or not (for example: blocks, interjoists, tiles, plates).

The expression "specific surface" within the meaning of the invention may correspond to a clay adsorption capacity. It can be measured by the French standard NFP 94-068 indicating a methodology allowing the determination of the methylene blue value of a soil or a rocky material by means of the methylene blue test. The specific surface can also be measured according to standard NF EN 933-9+A1. Indeed, there is a correlation, demonstrated as early as 1950 by Dyal and Hendricks, 1950, between the adsorption of the methylene blue molecule (in g/100 g) via electrostatic interactions, and the specific surface measurements of the clay material. Furthermore, the specific surface measurement can also be measured via the BET (Brunauer, Emmett and Teller) method. This method can preferably be implemented according to the recommendations of the standard ISO 9277:2010. Briefly, the specific surface is estimated from the amount of nitrogen adsorbed in relation to its pressure at the boiling temperature of liquid nitrogen and under normal atmospheric pressure. Information is interpreted according to the model of Brunauer, Emmett and Teller (BET method).

The expression "excavated clay soil" corresponds in the sense of the invention to a clay soil obtained following a step where the soil has been dug, for example during leveling and/or earthwork operations, for construction, building or filling. For example, excavated clay soil may correspond to quarry fines, dredged sediments, drilling/washing muds. In particular, when these fines, muds or sediments include clays having a specific surface greater than 100 $m^2/g$, preferably greater than 200 $m^2/g$ or even clays of the smectite family; preferably at contents greater than 20% by weight of the clay matrix, then they are particularly suitable for the present invention. In particular, within the meaning of the invention, the excavated clay soil may or may not be moved outside the production site. Preferably and according to an advantage of the invention, the excavated earth is used on the production site or at a distance of less than 200 km, preferably less than 50 km. Furthermore, advantageously, the clay earth excavated in the context of the invention is a raw excavated clay earth, that is to say that it has not undergone a calcination step. In particular, that is to say that it has not undergone any prior heat treatment. For example, this corresponds to a clay soil which has not undergone a temperature rise above 300° C., preferably above 200° C. and more preferably a temperature above 150° C. Indeed, the raw clay earth can undergo a heating step requiring a rise in temperature generally of substantially equal to 150° C. but no calcination step. A calcination step could for example correspond to a heat treatment at more than 600° C. for at least one hour. Clay as conventionally used has a relatively constant granulometric profile with sizes less than 2 μm. An excavated clay soil may have different granulometric profiles. In the context of the invention, an excavated clay soil may include particles of a size greater than 2 μm, preferably greater than 20 μm, preferably greater than 50 μm and for example greater than 75 μm as determined according to the standard ASTM D422-63. Preferably, the excavated clay soil does not contain any granulate larger than 2 cm as determined according to standard NF EN 933-1.

The field of construction must evolve to increase its productivity while responding to new societal challenges. In this context, manufacturers have proposed cement mixtures called more ecological cement mixtures including, for example, 50% Portland cement, 30% slag and 20% fly ash; high-performance concretes have also been proposed which may include superplasticizers, such as self-compacting concretes or else cellular concretes comprising gypsum, lime, cement and sand.

Nevertheless, these solutions do not allow to combine productivity (that is to say speed of setting and mechanical resistance) with a notable reduction in the carbon balance and comfort (in particular control of the temperature and of the humidity level) for the users.

To overcome this, the inventors have developed a new solution involving new construction binder formulations. This new solution has the advantage of having a carbon footprint much lower than most construction binders, or hydraulic binders, the most widely used in the world today (for example Portland cement). Furthermore, these solutions ensure optimum regulation of the temperature and of the ambient humidity level and can in certain cases ensure fast setting of the construction material including such a binder formulation. To this end, a binder according to the invention consists of a raw clay matrix, which has not undergone a calcination step, an energy-intensive step which also generates the emission of greenhouse gases and more particularly carbon dioxide. The invention relates in particular to a construction binder including a raw clay matrix, a deflocculation agent and an activation composition, characterized in that the raw clay matrix comprises at least smectite, montmorillonite or bentonite, preferably more than 10% by weight of a clay of the smectite family.

As will be presented in the examples, a method according to the invention allows to manufacture construction elements from a binder including a high concentration of raw clay matrix (generally greater than 10%, preferably greater than or equal to 20%), having a mechanical resistance at 28 days greater than 10 MPa, preferably greater than 12 MPa and having an MBV greater than 0.7, preferably greater than 1, and more preferably greater than 1.3 and even more preferably greater than 1.5. In particular, the inventors have developed construction binder compositions allowing to form construction materials having a minimum compressive strength on cylinders as measured by standard NF EN 206-1, at 28 days greater than or equal to 12 MPa, preferably greater than 15 MPa and a moisture buffer value greater than or equal to 0.7, preferably greater than or equal to 1, more preferably greater than or equal to 1.2 and even more preferably greater than or equal to 1.5.

The general and preferred characteristics of each of the constituents of the construction binder according to the invention will be presented in detail. These embodiments are applicable both to the construction binder according to the invention and to the other aspects of the present invention such as the methods, the construction material as such (including the prefabricated elements) or the uses of the construction binder and the construction material.

Raw Clay Matrix

The raw clay matrix may for example include at least one mineral species selected from: Illite, Kaolinite, Smectite, Bentonite, Vermiculite, Chlorite, Muscovite, Halloysite, Sepiolite, and Attapulgite.

In particular, the raw clay matrix comprises smectite, preferably Montmorillonite. In particular, the clay matrix includes at least 10% by weight of smectite, preferably montmorillonite, more preferably at least 20% by weight.

Indeed, the inventors have shown that, if the raw clay matrix includes at least one raw clay from the smectite family and in particular when the at least one raw clay from the smectite family represents more than 10% by weight of the construction binder, preferably at least 20% by weight of the construction binder, then the construction binder allows the preparation of construction materials combining mechanical properties and moisture buffering capacity.

The smectite family includes montmorillonites and bentonite.

Preferably, the raw clay matrix includes at least two types of clay selected from: Illite; Smectite preferably Montmorillonite; Kaolinite; Bentonite; Vermiculite; Chlorite; Muscovite; Halloysite; Sepiolite or Attapulgite. This includes clays called interstratified clays which are complex combinations of several clays. Even more preferably, the raw clay matrix comprises at least one mineral species selected from: Kaolinite, Illite, Smectite, Bentonite, Chlorite and Vermiculite.

Table 1 below presents the chemical characteristics of these mineral species.

TABLE 1

| Raw Clay Matrix | |
|---|---|
| Type of clay | Composition |
| Illite | $(K, H_3O)(Al, Mg, Fe)_2(Si, Al)_4O_{10}[(OH)_2, (H_2O)]$ |
| Smectite | $(Na, Ca)_{0.3}(Al, Mg)_2Si_4O_{10}(OH)_2$, n $H_2O$ |
| Kaolinite | $Al_2Si_2O_5(OH)_4$ |
| Bentonite | $(Na, Ca)_{0.3}(Al, Mg)_2Si_4O_{10}(OH)_2$ |
| Vermiculite | $(Mg, Ca)_{0.7}(Mg, Fe, Al)_6(Al, Si)_8O_{22}(OH)_4$, n $H_2O$ |
| Chlorite | $(Fe, Mg, Al)_6(Si, Al)_4O_{10}(OH)_8$ |

TABLE 1-continued

| Raw Clay Matrix | |
|---|---|
| Type of clay | Composition |
| Muscovite | $KAl_2(AlSi_3O_{10})$ (OH, F)$_2$ |
| Halloysite | $Al_2Si_2O_5(OH)_4$ |
| Sepiolite | $Mg_4Si_6O_{15}(OH)_2$, n $H_2O$ |
| Attapulgite | (Mg, Al, $Fe^{3+})_5[Si_8O_{20}](OH)_2(OH2)_4$ n $H_2O$ |

As has been explained, according to a preferred embodiment, a construction binder according to the invention will include at least two different types of clay and will include smectite.

The type of clay can be determined by methods known to the person skilled in the art. In particular, it will be possible to use X-ray diffractometry. For example, the following conditions may be used:

Equipment: Diffractometer, for example a BRUKER D8 ADVANCE (Bragg-Brentano Geometry); for example having the following settings: Copper tube (λKα1≈1.54 Å) Generator power: 40 kV, 40 mA; Primary optics: fixed slit 0.16°; Soller slit 2.5°; Secondary optics: Soller slit 2.5°; LynXeye XE-T Detector Acquisition parameters: Scan from 4 to 90°2θ; Scanning speed of 0.03°2θ/second, Counting time: 480 seconds per step; Rotating sample.

For example, a construction binder according to the invention comprises at least 10% by weight of raw clay matrix, preferably at least 20% by weight of raw clay matrix, more preferably at least 30% by weight of raw clay matrix and even more preferably at least 40% by weight of raw clay matrix. For example, at least 50% by weight of raw clay matrix or at least 60% by weight of raw clay matrix.

Furthermore, preferably, a construction binder according to the invention comprises at most 80% by weight of raw clay matrix, more preferably at most 70% by weight of raw clay matrix.

Thus, in particular, a construction binder according to the invention may comprise between 20 and 80% by weight of raw clay matrix, preferably between 30 and 80% by weight or between 40 and 80% by weight of raw clay matrix, more preferably between 40 and 70% by weight of raw clay matrix.

Preferably, the raw clay matrix of a construction binder according to the invention comprises at least 20% by weight of smectite, for example at least 30% by weight of smectite, preferably at least 40% by weight of smectite, more preferably at least 50% by weight smectite and even more preferably at least 60% by weight smectite.

In particular, a clay matrix according to the invention may comprise between 20 and 80% by weight of smectite, preferably between 30 and 70% by weight of smectite or between 40 and 60% by weight of smectite, more preferably between 40 and 60% by weight of smectite.

Preferably, the smectite may be Montmorillonite.

More preferably, the raw clay matrix of a construction binder according to the invention comprises at least one raw clay from the smectite family and at least one other raw clay selected from Kaolinite, Illite, Chlorite and Vermiculite. Even more preferably, the raw clay matrix of a construction binder according to the invention comprises smectite and at least one other raw clay selected from Kaolinite, Illite, Bentonite, Montmorillonite, Chlorite and Vermiculite.

Even more preferably, the construction binder includes excavated earth including the raw clay matrix. It may include at least 2% by weight of silt particles, preferably at least 4% by weight, more preferably at least 6% by weight. The silt particles are in particular particles having a diameter comprised between 2 μm and 125 μm, preferably between 2 and 50 μm.

The excavated clay soil may advantageously have been pretreated, said pretreatment being selected from: grinding, sorting, sieving and/or drying of the excavated clay soil. The pretreatment can for example include a fractionation.

The construction binder according to the invention has the advantage of being able to include a high amount of raw clay matrix without this altering either the hygroscopic properties or the mechanical properties of the construction materials, allowing to produce construction materials having, in addition, moisture buffering capacities, in some cases improved setting time compared to commonly used construction materials.

Deflocculation Agent

Many compounds can act as deflocculation agents and many are generally known to the person skilled in the art.

In the context of the invention, the deflocculation agent is in particular a nonionic surfactant such as a polyoxyethylene ether. The polyoxyethylene ether can for example be selected from: a poly(oxyethylene) lauryl ether.

The deflocculation agent can also be an anionic agent such as an anionic surfactant. In particular, the anionic agent can be selected from: alkylaryl sulfonates, aminoalcohols, fatty acids, humates (for example sodium humates), carboxylic acids, lignosulfonates (for example sodium lignosulfonates), polyacrylates, carboxymethylcelluloses and mixtures thereof.

The deflocculation agent can also be a polyacrylate. It can then be selected, for example, from sodium polyacrylate and ammonium polyacrylate.

The deflocculation agent can also be an amine selected, for example, from: 2-amino-2-methyl-1-propanol; mono-, di- or triethanolamine; isopropanolamines (1-Amino-2-propanol, diisopropanolamine and triisopropanolamine) and N-alkylated ethanolamines.

Alternatively, the deflocculation agent can be a mixture of compounds, such as a mixture including at least two compounds selected from: nonionic surfactant, anionic agent, polyacrylate, amine and organophosphorus compound.

The deflocculating agent may be an organic deflocculating agent. According to the present invention, an organic deflocculating agent includes at least one carbon atom and preferably at least one carbon-oxygen bond. Preferably, the deflocculation agent is selected from: a lignosulfonate (for example sodium lignosulfonate), a polyacrylate, a humate, a polycarboxylate such as an ether polycarboxylate, and mixtures thereof. More preferably, the deflocculation agent includes humate, lignosulfonate and/or polyacrylate.

The deflocculation agent is preferably in powder form (such as a salt).

However, the invention cannot be limited to the deflocculating agents mentioned above. Any type of deflocculating agent known to the person skilled in the art can be used instead of said deflocculating agents mentioned above.

In particular, the deflocculation agent represents at least 0.5% by weight of the raw clay matrix, preferably at least 1% by weight of the raw clay matrix, more preferably at least 2% by weight of the raw clay matrix, even more preferably at least 3% by weight of the raw clay matrix, and for example at least 4% by weight of the raw clay matrix. Furthermore, the deflocculation agent can represent at most 5% by weight of the raw clay matrix.

In particular, the deflocculation agent represents at least 0.1% by weight of the construction binder, preferably at least 0.5% by weight of the construction binder. Furthermore, the deflocculation agent may represent at most 5% by weight of the construction binder, preferably at most 4% by weight of the construction binder, more preferably at most 3% by weight of the construction binder, and even more preferably at most 2% by weight of the construction binder.

Indeed, with such concentrations of deflocculation agent, a construction binder according to the invention can then be used in combination with an activation composition to form a material with advantageous hygrothermal and mechanical properties. Furthermore, it is advisable not to exceed a certain rate of deflocculation agent in order to avoid degradation of the mechanical properties of the construction material. Too high a concentration of deflocculation agent in combination with the raw clay matrix and the activation composition may degrade the mechanical performance and/or the performance of MBV.

Activation Composition

The activation composition is preferably an alkaline activation composition.

An alkaline activation composition includes at least one base, such as a weak base or a strong base. The activation composition may preferably include one or more compounds having a pKa greater than or equal to 8, more preferably greater than or equal to 10, more preferably greater than or equal to 12, even more preferably greater than or equal to 14.

Thus, the alkaline activation composition may include sulfates, hydroxides, carbonates, lactates, organophosphates or combinations thereof.

Preferably, the alkaline activation composition includes hydroxides.

In particular, the alkaline activation composition may include a mixture of sodium/calcium sulfate and of sodium/calcium chloride.

Preferably, the alkaline activation composition includes carbonates. In particular, the alkaline activation composition may include a mixture of sodium or potassium silicate and sodium or potassium carbonate. The activation composition may also include an alkaline compound, preferably a strong base.

Advantageously, the activation composition includes an oxide of a metal having at least two valence electrons. Indeed, in such a configuration, the moisture buffer value is improved compared to an alkaline activation composition based on sulfates, hydroxides, carbonates, lactates, organophosphates or combinations thereof. In particular, the activation composition may include at least 40% by weight of at least one metal oxide corresponding to the oxide of a metal having at least two valence electrons. For example, the at least 40% by weight may correspond to several different metal oxides. However, preferably, the activation composition, preferably when the latter is an alkaline activation composition, may include a single oxide of a metal having at least two valence electrons or more than 50% by weight of this metal oxide.

Preferably, the activation composition includes at least 50% by weight of at least one metal oxide corresponding to the oxide of a metal, or of an alkaline earth, having at least two valence electrons, more preferably at least 60% by weight; even more preferably at least 80% by weight.

The presence of metal oxides, for example having at least two valence electrons, can be identified by X-ray fluorescence spectrometry (XRF) and/or by X-ray diffraction (XRD).

The alkaline activation composition may include an organophosphorus compound such as sodium tripolyphosphate. Preferably, the organophosphorus compound represents at least 2% by weight of the construction binder.

Preferably, the alkaline activation composition includes a lactate such as sodium, potassium and/or lithium lactate.

As will be described below, the activation composition can be a liquid composition. In particular, the activation composition can be an aqueous composition. As will be described later, its use can be combined with the addition of water during the formation of a construction binder according to the present invention. However, alternatively, the activation composition is in solid form, for example in powder form. The indicated percentage of alkaline activation composition corresponds to the dry weight of the composition.

The activation composition is for example present at a content of at least 2% by dry weight of the construction binder.

Preferably, the construction binder comprises from 2% to 50% by dry weight of an alkaline activation composition. More preferably, the construction binder comprises from 2% to 40% by dry weight of an alkaline activation composition. Even more preferably, the construction binder comprises from 10% to 20% by dry weight of an alkaline activation composition.

As will be illustrated in the examples, the concentration of alkaline activation composition required can vary widely depending on its composition. Thus, the construction binder according to the invention may comprise from 20% to 40% by weight of an alkaline activation composition. This is particularly the case when the alkaline activation composition includes hydroxides. Alternatively, the construction binder according to the invention may comprise from 2% to 10% by weight of an alkaline activation composition. This is particularly the case when the alkaline activation composition includes carbonates. Finally, the construction binder according to the invention may comprise from 10% to 30% by weight of an alkaline activation composition, preferably from 15% to 25% by weight of an activation composition.

The presence of constituents of the activation composition can be identified by spectrometry methods which will depend on the activation composition used. For example, it will be possible to identify constituents of the composition in a construction material by infrared spectrometry.

Calcined Metal Oxide Composition

As will be presented in the examples, a construction binder according to the invention preferably includes less than 15% by weight of Portland cement, more preferably less than 10% by weight, less than 8% by weight, less than 5% by weight, less than 3% by weight, less than 2% by weight and even more preferably does not include Portland cement.

Indeed, the presence of Portland cement leads to a reduction in the moisture buffer value.

A metal oxide composition advantageously includes metal oxides selected from: iron oxides such as FeO, $Fe_3O_4$, $Fe_2O_3$, alumina $Al_2O_3$, manganese(II) oxide MnO, titanium (IV) oxide $TiO_2$, magnesium oxide MgO and mixtures thereof. It may also include metal oxides selected from: calcium oxides and magnesium oxides.

A composition of metal oxides may also include aluminosilicates.

The composition of metal oxides is for example selected from:

- blast furnace slags,
- pozzolans such as volcanic ash, fly ash, silica fume or metakaolin,
- ash from plant matter such as rice ash,
- bauxite residue, or
- combinations thereof.

Preferably, in the calcined metal oxide composition, the metal oxides are transition metal oxides. The metal oxides can preferably come from a composition of blast furnace slags, for example formed during the production of cast iron from iron ore.

The inventors have identified the importance of the amount by mass of metal oxides in combination with the raw clay matrix. Preferably, the construction binder includes at least 10% by weight of metal oxides.

For example, a construction binder according to the invention may include at least 15% by weight of a composition of blast furnace slags.

Advantageously, the construction binder includes for example 10% by weight of aluminosilicate, preferably at least 10% by weight, more preferably at least 20% by weight, resulting from a calcination method.

For example, the construction binder may include a composition of at least 20% by weight of calcined aluminosilicates or else the calcined metal oxide composition includes aluminosilicates representing at least 20% by weight of the construction binder.

The aluminosilicates come for example from alumina, red mud, fly ash, blast furnace slag or metakaolin.

Without being limited by theory, a balance between the amount of the calcined metal oxide composition and the raw clay matrix will, in combination with the alkaline activation composition, strengthen the bonds between the clay sheets so as to bring its mechanical properties to the binder while maintaining, thanks to the deflocculation agent and the type of clay selected, optimal hygrothermal properties. This is particularly true when the clay matrix includes smectite which the inventors have discovered to be particularly suitable, in combination with a deflocculation agent and an activation composition, for the preparation of construction materials having a high MBV value (for example>0.7, or preferably greater than 1).

Furthermore, the inventors have identified that certain values of the ratio between the amount by mass of composition of metal oxides and the amount by mass of raw clay matrix allow an adequate balance between mechanical resistance, hygrometric capacity and speed of setting.

Advantageously, the composition of metal oxides and the raw clay matrix are present in the construction binder so that a mass ratio of the raw clay matrix to the composition of metal oxides is less than or equal to 6, preferably less than or equal to 4, more preferably less than or equal to 2.

For example, the composition of metal oxides and the raw clay matrix are present in the construction binder so that a mass ratio of the raw clay matrix to the composition of metal oxides is preferably greater than or equal to 0.3; more preferably greater than or equal to 0.5 and even more preferably greater than or equal to 1.

For example, the composition of metal oxides and the raw clay matrix are present in the construction binder so that a mass ratio of the raw clay matrix to the composition of metal oxides is comprised between 0.3 and 3, more preferably comprised between 1 and 3, even more preferably comprised between 1 and 2.

Advantageously, the composition of metal oxides and the deflocculation agent are present in the construction binder so that a mass ratio of the composition of metal oxides to the deflocculation agent is greater than or equal to 12, preferably greater than or equal to 15.

In particular, the composition of metal oxides, also called calcined metal oxide composition, represents from 20% to 70% by weight of the construction binder.

Preferably, the composition of metal oxides, also called calcined metal oxide composition, represents from 35% to 65% by weight of the construction binder.

More preferably, the composition of metal oxides, also called calcined metal oxide composition, represents from 40% to 65% by weight of the construction binder.

The presence of constituents of the calcined metal oxide composition can be identified by spectrometric methods which will depend on the calcined metal oxide composition used. For example, it will be possible to identify constituents of the calcined metal oxide composition in a construction material by scanning electron microscopy, by scanning electron microscopy coupled with a microprobe or else by measurement by X-ray fluorescence spectrometry (XRF) and/or by X-ray diffraction (XRD).

The construction binder may include many other compounds. For example, it may comprise an adjuvant, preferably representing at least 1% by weight of said binder. In particular, the adjuvant is an air entrainer. The person skilled in the art can for example use those known in conventional concretes.

As has been detailed, according to the inventors, it has never been proposed to combine blast furnace slag, fly ash or the like with raw clay, and an activation composition, which is preferably alkaline, to produce a construction material with a good MBV (that is to say greater than or equal to 0.7) and able to set quickly. In particular, it has never been proposed to combine blast furnace slag, fly ash or the like with a clay matrix including at least one raw clay from the smectite family, the at least one raw clay from the smectite family represents at least 20% by weight of the construction binder, and an activation composition, which is preferably alkaline, to produce a construction material having good moisture buffering capacity (MBV) and may have fast setting. These construction binder compositions further including less than 15% by weight of Portland cement.

Furthermore, among all the formulations, compositions or binders according to the invention which can be used effectively in a method according to the invention, the inventors have identified certain formulations of construction binder which are novel as such and which have a reduced carbon balance, a fast setting, hygrothermal properties and high mechanical performance. These novel and particularly effective formulations form part as such of the subject of the present invention.

The invention also relates to a construction binder including a raw clay matrix, a deflocculation agent, an activation composition said construction binder including:

- at least 40% by weight of raw clay matrix, said raw clay matrix includes at least one raw clay from the smectite family; and the at least one raw clay from the smectite family represents at least 20% by weight of the construction binder; and
- less than 15% by weight of Portland cement.

The invention also relates to a construction binder including a raw clay matrix, a deflocculation agent, an activation composition, said construction binder including:

at least 40% by weight of raw clay matrix, said raw clay matrix includes at least one raw clay from the smectite family; and the at least one raw clay from the smectite family represents at least 20% by weight of the construction binder;

at least 35% by weight of blast furnace slag; and less than 15% by weight of Portland cement.

The invention also relates to a construction binder including a raw clay matrix, a deflocculation agent, an activation composition, said construction binder including:

at least 40% by weight of raw clay matrix, said raw clay matrix includes at least one raw clay from the smectite family; and the at least one raw clay from the smectite family represents at least 20% by weight of the construction binder;

less than 15% by weight Portland cement; and at least 0.5% by weight of deflocculation agent, the deflocculation agent including an organic compound selected from: humates, lignosulfonate and polyacrylate.

The invention also relates to a construction binder including a raw clay matrix, a deflocculation agent, an activation composition, said construction binder including:

at least 40% by weight of raw clay matrix, said raw clay matrix includes at least one raw clay from the smectite family; and the at least one raw clay from the smectite family represents at least 20% by weight of the construction binder;

less than 15% by weight Portland cement; and at least 15% by weight of activating agent, the activating agent including at least 70% by weight of at least one metal oxide corresponding to the oxide of a metal having at least two valence electrons.

According to another aspect, the invention relates to a use, for the preparation of a construction binder, of a raw clay matrix including a mixture of at least two types of clay having a specific surface at least equal to 100 $m^2/g$, in combination with a deflocculation agent and an activation composition. In particular, the raw clay matrix includes at least one clay having a specific surface at least equal to 100 $m^2/g$, a specific surface at least equal to 150 $m^2/g$; a specific surface at least equal to 200 $m^2/g$; or a specific surface at least equal to 250 $m^2/g$. Preferably, the raw clay matrix includes at least two clays having a specific surface at least equal to 100 $m^2/g$, a specific surface at least equal to 150 $m^2/g$; a specific surface at least equal to 200 $m^2/g$; or a specific surface at least equal to 250 $m^2/g$.

The invention also relates to a use, for the preparation of a construction binder, of a raw clay matrix including at least one raw clay from the smectite family, the at least one raw clay from the smectite family represents at least 20% by weight of the construction binder, in combination with a deflocculation agent and an activation composition; and the construction binder comprising less than 15% by weight of Portland cement.

The construction binder according to the invention can be used to produce cladding elements, in particular floor cladding, such as tiles, slabs, cobblestones or curbs, wall cladding, such as interior or exterior facade elements, brick slips, paneling elements, or roof cladding of the tile type, for the production of extruded or molded building modules, such as bricks, or for the production of various extruded shapes.

The construction binder according to the invention can be used for the production of composite materials, such as construction panels of the prefabricated panel type, prefabricated blocks such as door or window lintels, prefabricated wall elements, or any other prefabricated building element.

The construction binder according to the invention can be used for the production of insulation modules, such as partition panels, or light insulating construction modules (with a density of less than 1.5 kg/L, preferably less than 1.2 kg/L, more preferably less than 1.0 kg/L, more preferably less than 0.7 kg/L).

The invention also relates to the use of the construction binder according to the invention, for the implementation of additive manufacturing. In particular, the implementation of an additive manufacturing can be carried out by means of an automated 3D construction system such as a 3D printer. Such additive manufacturing can allow the manufacture of construction elements, buildings or houses, or even decorative objects.

The construction binder according to the invention can be used in the form of a two-component system with either on the one hand the constituents in solid form, and on the other hand the constituents in liquid form, or the constituents in the form of two pastes, for the production of mastic, glue or sealing mortar.

According to another aspect, the invention relates to a method for the preparation of a construction binder. Such a method according to the invention relates in particular to the production of a construction binder allowing to generate construction materials having high moisture buffering capacities (that is to say greater than 0.75).

As before, the raw clay matrix may include at least one mineral species selected from: Illite; Smectite preferably Montmorillonite; Kaolinite; Bentonite; Vermiculite; Chlorite; Muscovite; Halloysite; Sepiolite or Attapulgite. This includes clays called interstratified clays which are complex combinations of several clays.

The method includes in particular the mixing of a raw clay matrix, of a deflocculation agent and of an activation composition. The raw clay matrix includes at least one raw clay from the smectite family and the at least one raw clay from the smectite family represents at least 20% by weight of the construction binder. Furthermore, the construction binder preferably comprises less than 15% by weight Portland cement.

The method may include a step of homogenization, or of mixing, so as to obtain a construction binder. This homogenization or mixing step can in particular last at least 45 seconds, preferably at least 60 seconds, more preferably at least 90 seconds; and for example less than 30 minutes; preferably less than 10 minutes; more preferably less than 5 minutes.

After the mixing step, the method according to the invention may include the addition of additives or materials allowing to modify the mechanical properties of the final construction material.

The materials added can for example be granulates, whether recycled or not, selected from fillers, powders, sand, rubble, gravel, and/or fibers, and optionally pigments. In general, the granulates may correspond to sand or sand and other aggregates such as rubble, gravel, pebbles, hemp shives and/or other plant aggregates.

The method may also include the addition of a plasticizer or a superplasticizer.

The method may also include the addition of fibers. The fibers are, for example, selected from: plant fibers such as flax cotton, hemp, cellulose, bamboo, miscanthus fibers, synthetic fibers such as metal, glass, carbon, polypropylene fibers and mixtures thereof. The presence of fibers can allow the formation of a construction material with improved mechanical and insulating properties.

The method may also include adding aggregates. The aggregates are for example selected from: gravel, crushed, recycled concrete and mixtures thereof.

The method may also include the addition of additive. The additive is for example selected from: a synthetic or natural rheological control agent, an anti-shrinkage agent, a water-retaining agent, an air-entrainer agent, a synthetic resin and mixtures thereof.

The preparation of a construction binder according to the invention will include in particular the addition of sand and water. The sand may possibly come from cuttings, in particular in the case of "site" concrete. The sand can also be desert sand.

The construction materials obtained can for example be selected from: mortars, coatings, or plasters.

In certain embodiments, the construction binder will be used for the preparation of the prefabrication element.

Thus, according to another aspect, the invention relates to a method for producing a prefabricated element. In this context, it is important, in addition to the moisture buffering capacities, that the construction binder can allow fast setting of the construction material.

The prefabrication element is in particular prepared from a construction binder including a raw clay matrix, a deflocculation agent and an activation composition to which granulates and water have been added.

In particular, in the construction binder used in this method, the raw clay matrix includes at least one raw clay from the smectite family; the at least one raw clay from the smectite family represents at least 20% by weight of the construction binder; and the construction binder comprises less than 15% by weight of Portland cement. As mentioned, the method benefits from the embodiments of the construction binder thus, more preferably the construction binder comprises less than 10% by weight of Portland cement, less than 8% by weight, less than 5% by weight, less than 3% by weight, less than 2% by weight and even more preferably does not include Portland cement.

As illustrated in FIG. 1, a method 100 according to the invention includes the following steps: a step 110 of supplying a construction binder, a step 120 of mixing the constituents of the binder for construction material with the granulates and the water, and a step 130 of curing the mixture.

As illustrated, the method according to the invention may also include steps of preparing 101 molds, of unmolding 140 the prefabrication element and of drying 150 the prefabrication element.

However, as will be illustrated in the examples, the inventors have determined selections of clays and conditions of use allowing to obtain construction materials allowing high levels of mechanical resistance and fast setting despite high levels of raw clay. In particular, under the conditions selected, the clay matrix may be present at more than 10% by weight of the binder for construction material, preferably it is present at more than 20% by weight of the binder for construction material.

Thus, it is possible to obtain materials that may have a moisture buffering capacity greater than or equal to 0.75, a low carbon balance while respecting the productivity requirements of the construction industry.

In particular, as will be illustrated in the examples, the raw clay matrix includes at least one raw clay from the smectite family. It is when the raw clay matrix includes these clays (one or more) that the best results in terms of moisture buffering capacity are obtained.

In addition to the choice of clays to be used, the inventors have determined that in order to obtain a construction material having a high moisture buffering capacity while having fast setting, it is necessary to add a deflocculating agent and to carry out a heat treatment.

Thus, advantageously, in the context of a method 100 for producing a prefabricated element according to the invention, the curing step 130 includes a heat treatment of the mixture. Indeed, the combination of carrying out a heat treatment and the presence of clays of the smectite family allows to obtain a construction material having moisture buffering capacities greater than or equal to 0.75 while having a fast setting.

As mentioned and illustrated in FIG. 1, a method 100 for producing a prefabrication element according to the invention may include steps for preparing 101 molds, with, for example, the use of mold release agent and formwork oil, the use of shims for reinforcement, or else the use of systems allowing airtight covering of parts or curing products.

Furthermore, the method according to the invention may include a first step of preparing a construction binder mixture. The step of preparing the construction binder mixture may for example include a dry mixing. Indeed, a majority or all of the constituents of the construction binder can be used in dehydrated form.

Alternatively, a portion of the constituents can be mixed dry while another portion of the constituents is added in liquid form.

In particular, the method according to the invention includes a step 120 of mixing the constituents of the construction binder with granulates and water.

The water to dry matter mass ratio of the composition, referred to here as construction binder, is preferably controlled. The water/dry matter mass ratio is preferably less than 1, more preferably less than or equal to 0.6 and even more preferably less than or equal to 0.5. This ratio does not take into account the amount of granulates added.

Conventionally, the granulates may correspond to natural granulates, artificial granulates or else recycled granulates. The granulates may further include mineral granulates, that is to say mainly consisting of mineral material and/or vegetable granulates, that is to say mainly consisting of material of vegetable origin. The granulates may further include marine granulates, that is to say mainly consisting of organic or inorganic material originating from the seabed, such as siliceous granulates and limestone substances (for example maerl and shell sands). The mineral granulates may, for example, correspond to sand, rubble, gravel, fillers (or fine materials), powders, fossilized waste and their combination.

Plant granulates may, for example, correspond to wood (chips or fibers), hemp, straw, hemp shives, miscanthus, sunflower, cattail, corn, flax, rice husks, wheat bales, rapeseed, seaweed, bamboo, cellulose wadding, shredded cloth and their combination.

In particular, when a construction material or a prefabricated element according to the invention will include vegetable granulates, it preferably includes at least 10% by weight of vegetable granulates, preferably at least 15% by weight of vegetable granulates, more preferably at least 20% by weight of vegetable granulates, and even more preferably at least 25% by weight of vegetable granulates. Generally, when plant granulates are used, the construction material or prefabricated element according to the invention will preferably include at most 60% by weight of plant granulates, and more preferably at most 50% by weight of plant granulates. For example, the construction material or prefabricated element according to the invention may preferably include between 10% and 50% by weight of plant granulates and more preferably between 15% and 35% by weight of plant granulates. When using plant granulates in the compressed concrete block according to the invention, they may be combined with mineral granulates such as sand. This can improve the mechanical performance.

Such a mixing step can advantageously but not exhaustively be carried out in a device selected from: a mixer and a truck mixer or more generally within any device suitable for mixing a construction binder. A dispersion device using, for example, ultrasound can be used.

Furthermore, the mixing step 120 can be carried out over a duration of at most 24 hours, preferably of at most 12 hours, more preferably of at most 6 hours. Advantageously, in the context of a method 100 for manufacturing a prefabrication element, it can be only several tens of minutes and therefore less than one hour or even a few tens of seconds. Indeed, the mixtures can be made in the context of manufacturing on a press, which is vibrating or not, where the mixture is made a few seconds before the molds are filled.

Before the optional curing step 130, during or before the mixing step 120, the method 100 according to the invention may include the addition of additives or materials allowing to modify the mechanical properties of the final construction material.

Thus, the method may also include the addition of a plasticizer or a superplasticizer.

The method 100 may also include adding fibers. The fibers are, for example, selected from: plant fibers such as flax cotton, hemp, cellulose, bamboo, miscanthus fibers, synthetic fibers such as metal, glass, carbon, polypropylene and mixtures thereof. The presence of fibers advantageously allows the formation of a construction material with improved mechanical and insulating properties, while retaining a moisture buffering capacity.

The method 100 may also include adding aggregates. The aggregates are for example selected from: gravel, crushed, recycled concrete and mixtures thereof.

The method 100 may also include the addition of an additive. The additive is for example selected from: a synthetic or natural rheological control agent, an anti-shrinkage agent, a water-retaining agent, an air-entrainer agent, a synthetic resin and mixtures thereof.

The method 100 according to the invention may also include a step of curing 130 the mixture.

The curing step 130 is generally known to the person skilled in the art who will be able to implement it. It can for example be carried out either by maintaining the products in hardening chambers, or with covering or else with spraying of water or curing products.

The curing step 130 preferably lasts at most 48 hours, preferably at most 24 hours, more preferably less than 23 hours and it can be substantially equal to 20 hours. The curing step 130 generally lasts at least two hours, preferably at least six hours and more preferably at least 12 hours.

Preferably, in the context of the invention, the curing step 130 is carried out in an airtight mold. The airtight mold advantageously allows to limit or eliminate the exchanges between the mixture and the outside air.

The curing step may or may not include a heat treatment. However, even in the case of the occurrence of a heat treatment, the latter is carried out at a temperature of less than 500° C. thus, the clay is always raw after curing and there is no bound water removal. In other words, the clay is not calcined and can still be considered raw clay. The effectiveness of the pozzolanic reaction on the mechanical properties of the concrete is not related here to a total dehydroxylation and an amorphization of the clay contrary to what is observed during the use of metakaolin (Konen and al., Etude comparative de la déshydroxylation/amorphisation dans deux kaolins de cristallinité différente. J. Soc. Ouest-Afr. Chim. (2010) 030; 29-39). Furthermore, the reaction with the activation composition does not modify the structure of the raw clay which can always be identified in the final material by scanning electron microscopy for example.

In the context of the present invention, preferably, the heat treatment is carried out at a temperature above 25° C., preferably above 30° C. However, in order to respect a favorable energy balance, the curing step is carried out at a temperature below 120° C., preferably below 100° C. and more preferably below or equal to 80° C. For example, the heat curing step is carried out at a temperature comprised between 20° C. and 90° C., preferably the heat curing step is carried out at a temperature comprised between 25° C. and 80° C.; even more preferably between 25° C. and 65° C.

Furthermore, the heat treatment can be carried out over the entire curing step but also over a shorter period. Thus, preferably, the heat treatment is carried out over a period of less than or equal to 20 hours, more preferably less than 15 hours, and even more preferably less than 10 hours.

As illustrated in FIG. 1, the method according to the invention may include a step 140 of unmolding the prefabricated element. The unmolding step 140 is generally known to the person skilled in the art who will know how to implement it. This step is in particular facilitated by any mold preparation steps, with, for example, the use of mold release agent and formwork oil, the use of shims for reinforcement, or else the use of systems allowing an airtight covering of the parts.

Finally, the method according to the invention may include a step of drying 150 the prefabricated element. The drying step 150 is generally known to the person skilled in the art who will know how to implement it. This step can take place in special conditions, in particular sheltered from the wind, frost and the sun for example.

Within the context of the various embodiments and characteristics of the present invention, the inventors have been able, for the first time, to obtain a prefabrication element or a construction material having a moisture buffer value greater than or equal to 0.75, preferably greater than or equal to 01, more preferably greater than or equal to 1.2.

Furthermore, certain prefabrication elements or a construction material are fast-setting, having a minimum resistance to compression on cylinders, after 20 hours or less of the curing step, as measured by standard NF EN 206-1 greater or equal to 16 MPa, preferably greater than or equal to 18 MPa, more preferably greater than or equal to 20 MPa. Thus, the construction binder is in particular a fast-setting construction binder and likewise, the construction material according to the invention is a fast-setting construction material.

The methods according to the invention can incorporate the embodiments of the construction binder described above, whether or not they are advantageous, particular or preferred, in particular characteristics concerning the main constituents of the construction binder: the raw clay matrix, the deflocculating agent, the activation composition and the calcined metal oxide composition.

According to another aspect, the invention relates to a construction material comprising a construction binder according to the invention. In particular, the invention relates to a construction material formed from a construction binder according to the invention. The construction materials can for example be selected from: a mortar, a coating, a plaster, an insulator, a lightweight concrete, a prefabrication element.

The invention relates to a construction material obtained, or likely to be obtained, from a method according to the invention.

Advantageously, the construction binder according to the invention is used to form a construction material so that the fillers represent between 200% and 900% by weight of the construction binder. For example, in a construction material according to the invention, the construction binder according to the invention preferably represents between 10% and 33% by weight of the construction material.

In particular, a construction material formed from the construction binder according to the invention will include at least 5% by weight of raw clay from the smectite family. Preferably, the construction material will include at least 8% by weight of raw clay from the smectite family and even more preferably at least 10% by weight of raw clay from the smectite family.

Advantageously, a construction material formed from the construction binder according to the invention will also include at least 5% by weight of at least one metal oxide corresponding to the oxide of a metal having at least two valence electrons. Preferably, the at least 5% by weight can be formed from several different metal oxides. These metal oxides may come from several sources. Preferably, the metal oxides formed with a metal having at least two valence electrons will be contained in the activation composition and/or in the calcined metal oxide composition. Preferably, the construction material includes at least 10% by weight of at least one metal oxide corresponding to the oxide of a metal having at least two valence electrons, more preferably at least 15% by weight; even more preferably at least 20% by weight.

The construction material according to the invention may comprise plant fibers, preferably hemp shives.

The construction material according to the invention may comprise diatom frustules.

The construction material according to the invention may have a moisture buffer value greater than or equal to 0.75; preferably greater than or equal to 1; more preferably greater than or equal to 1.2.

The construction material according to the invention may have a minimum resistance to compression on cylinders at 1 day as measured by standard NF EN 206-1 greater than or equal to 2 MPa; preferably greater than or equal to 3 MPa, preferably greater than or equal to 5 MPa.

The construction material according to the invention may have a minimum resistance to compression on cylinders at 7 days as measured by standard NF EN 206-1 greater than or equal to 8 MPa, preferably greater than or equal to 10 MPa.

Furthermore, the construction material according to the invention may have a minimum compressive strength on cylinders at 28 days as measured by standard NF EN 206-1 of less than or equal to 40 MPa, for example less than or equal to 30 MPa and preferably as illustrated in the examples, less than or equal to 20 MPa. However, for certain applications, the minimum compressive strength on cylinders at 28 days may be much lower.

Preferably, the construction material according to the invention may have a minimum compressive strength on cylinders at 28 days as measured by standard NF EN 206-1 ranging from 10 to 30 MPa, preferably from 10 to 20 MPa.

The construction material according to the invention can be formed from a construction binder comprising excavated earth including the raw clay matrix. The construction binder according to the invention can be used for the manufacture of:

- Insulating construction material: binder according to the invention and light granulates of the "vegetable or porous" type;
- Mortar and concrete sprayed by dry or wet process,
- Poured concrete/mortar,
- Compacted concrete/mortar,
- Extruded concrete/mortar,
- Concrete foam,
  - Lightweight concrete: the construction binder according to the invention may for example include straw, rice husk, hemp shives, seaweed, wood chips, sunflower, sargassum, reed, wheat husks or other cereals and mixtures thereof;
  - Fibered concrete with carbon, glass, polypropylene, flax, hemp, yucca, jute, kenaf, Mauritania ampelodesmos, coconut, oil palm, date palm oil, banana and pineapple fibers . . . ,
  - High-temperature performance concrete,
  - Liquid screed, Mortar,
  - Constructive systems or prefabrication elements: manufacture of concrete blocks or slabs in the factory from the binder according to the invention, such as posts including in particular silica fumes, earth concrete, a wooden frame/earth concrete coupling, earth mortar walls, reinforced Earth Concrete, and
  - Insulation modules.

The invention also relates to the use of the construction binder according to the invention, for the production of composite materials or prefabricated blocks.

The composite materials are, for example, construction panels of the prefabricated panel type, while the prefabricated blocks are, for example, door or window lintels, prefabricated wall elements, or any other prefabricated construction element.

Thus, in particular, the invention relates to a prefabricated element capable of being formed from a construction binder according to the invention. Advantageously, this prefabricated element will have been formed from a construction binder according to the invention.

Preferably, this prefabricated element, such as a partition, has a face with a surface area of at least 1 $m^2$, more preferably of at least 1.5 $m^2$, even more preferably of at least 2 $m^2$.

Furthermore, the prefabricated element may have a thickness comprised between 0.3 cm and 20 cm, advantageously between 0.5 cm and 10 cm and more preferably between 1 cm and 7 cm.

Such a prefabricated element advantageously has a moisture buffer value greater than or equal to 0.75, preferably greater than or equal to 1, more preferably greater than or equal to 1.2 and even more preferably greater than or equal to 1.5. This is particularly useful when the prefabricated element has a face with a surface area of at least 1 $m^2$, more preferably at least 1.5 $m^2$, even more preferably at least 2 $m^2$.

Furthermore, the invention is particularly suitable for such prefabricated elements when it includes excavated clay soil.

In particular, the construction binder according to the present invention is particularly suitable for a partition manufacturing method. Indeed, in order to be able to form building walls or prefabricated partitions, it is necessary to be able to have a resistant construction material and having a fast setting time, that is to say having a resistance to compression of at least 2 MPa after 24 hours and greater than 10 MPa after 28 days and which, once dry, has an MBV greater than 0.8, preferably greater than 1.2 and for example comprised between 0.8 and 3.

Thus, the present invention relates to a use of a construction binder according to the present invention for the manufacture of partitions, preferably prefabricated partitions and even more preferably partitions having a compressive strength of at least 2 MPa after 24 hours and greater than 10 MPa after 28 days and which, once dry, has an MBV comprised between 0.8 and 3.

Such a use may include the addition to the construction binder according to the invention of fillers such as: sand, plant fibers such as hemp shives.

Advantageously, the construction binder according to the invention is used so that the fillers represent between 200% and 900% by weight of the construction binder. For example, in a partition according to the invention, the construction binder according to the invention preferably represents between 10% and 33% by weight of the construction material.

The invention also relates to a partition prepared from a construction binder according to the invention. Such a partition may include other biosourced materials. In particular, when a construction binder according to the present invention is used for the manufacture of an insulating construction material, it may include light granulates of plant origin.

A preferred embodiment of the invention was presented in detail above.

Nevertheless, the characteristics of this embodiment, for example the advantageous, particular, preferred or non-preferred characteristics, can be combined with other embodiments presented below.

Indeed, the present invention also relates to a construction binder including a raw clay matrix, a deflocculation agent and an activation composition, characterized in that it has a minimum resistance to compression on cylinders as measured by the standard NF EN 206-1, at 28 days greater than or equal to 12 MPa, preferably greater than 15 MPa and a moisture buffer value greater than or equal to 0.7, preferably greater than or equal to 1, more preferably greater or equal to 1.2 and even more preferably greater than or equal to 1.5. Advantageously, the construction binder will also include a calcined metal oxide composition. In particular, the present invention relates to a construction binder including a raw clay matrix, a deflocculation agent and an activation composition, the construction binder allowing the preparation of a construction material having a minimum resistance to compression on cylinders as measured by standard NF EN 206-1, at 28 days greater than or equal to 12 MPa, preferably greater than 15 MPa and a moisture buffer value greater than or equal to 0.7, preferably greater than or equal to 1, more preferably greater than or equal to 1.2 and even more preferably greater than or equal to 1.5 measured no earlier than 10 days after manufacture and preferably 28 days. Advantageously, the construction binder will further include a calcined metal oxide composition.

The invention may also relate to a construction binder including a raw clay matrix, a deflocculation agent and an activation composition, the raw clay matrix comprising a mixture of at least two types of clay, preferably the clay matrix including at least smectite. More preferably, the two types of clays have a specific surface at least equal to 30 $m^2/g$, preferably at least equal to 50 $m^2/g$, more preferably greater than 100 $m^2/g$.

Even more preferably, the invention relates to a construction binder including a raw clay matrix, a deflocculation agent, and an activation composition, characterized in that the raw clay matrix comprises a mixture of at least two types clays, for example including smectite, and in that the binder further includes a calcined metal oxide composition. Advantageously, the calcined metal oxide composition is a blast furnace slag. Preferably, the construction binder includes at least 20% by weight of calcined metal oxide composition, more preferably at least 20% by weight of blast furnace slag.

The invention also relates to a construction binder including a raw clay matrix, a deflocculation agent, an activation composition and a calcined metal oxide composition, characterized in that the deflocculation agent includes a lignosulfonate, a polyacrylate, a humate or a mixture thereof.

The invention also relates to a construction binder including a raw clay matrix, a deflocculation agent, an activation composition and a calcined metal oxide composition, characterized in that it includes from 30% to 70% by weight, preferably from 40% to 60% by weight of raw clay matrix and in that it has:

- a ratio (raw clay matrix)/(calcined metal oxide composition) of less than 6, preferably less than 4, preferably comprised between 1 and 3; and
- a ratio (calcined metal oxide composition)/(deflocculation agent) greater than 12; and
- preferably the calcined metal oxide composition being a slag obtained from metallurgy, such as a blast furnace slag.

The invention also relates to a construction binder including a raw clay matrix, a deflocculation agent, an activation composition and a calcined metal oxide composition, characterized in that it includes:

- from 30% to 70% by weight, preferably from 40% to 60% by weight of raw clay matrix;
- from 15% to 45% by weight, preferably from 20% to 40% by weight of the calcined metal oxide composition;
- and preferably, the raw clay matrix includes at least two types of clay.

As illustrated by the examples below, the present invention provides a solution based on a mixture of raw clay matrix, deflocculating agent and activation composition to provide a construction binder with mechanical properties similar to the standard while having a reduced carbon footprint.

EXAMPLES

Preparation of a Construction Binder

In all the examples presented below, the formulations according to the invention are prepared according to an identical protocol, namely that a dry premix is carried out between a raw clay matrix, a deflocculating agent and the activation composition in predetermined amounts, then water is added and the solution is mixed at low speed, that is to say substantially at sixty revolutions per minute for thirty seconds. Then sand is added to the premix and everything is mixed at higher speed, that is to say at about 120 revolutions per minute for one minute.

The water to dry matter mass ratio of the composition (also called construction binder) is adjusted to a value comprised between 0.4 and 0.6.

In a particular example, the construction material, a mortar, includes 25% by weight of binder, 75% by weight of sand; this mixture being supplemented with water for a mass ratio of water to dry matter of the binder adjusted to a value of 0.5.

The mortar based on the construction binder thus formed is then poured into a mold then left to mature at room temperature, that is to say about 20 degrees Celsius for twenty-eight days.

Alternatively, the mortar can be poured into a mold then left to mature for less than twenty-four hours in a curing step, at room temperature, that is to say about 25 degrees Celsius or preferably under heat treatment. During this curing step, the mold can be made airtight or the upper layer of the construction material can be covered with a curing product to limit/prevent evaporation.

Methodology for Measuring the Mechanical Properties of Construction Binders

Once the maturation is complete, the mechanical resistance is measured. The term mechanical strength of a construction binder means its resistance to compression, such compression being measured according to standard NF EN 196-1, for a prism of 40 millimeters wide and 160 millimeters long and is expressed in Mega Pascal (MPa).

Methodology for Measuring MBV Values

The moisture buffer value can be measured by any method known to the person skilled in the art. For example, the person skilled in the art may refer to the method described in "Durability and hygroscopic behaviour of biopolymer stabilised earthen construction materials" Construction and Building materials 259 (2020). The samples are placed in a climatic chamber at 23° C. and 33% relative humidity and are left until they have a constant mass (for example a climatic chamber model MHE 612). All samples equilibrate after 15 days of storage under these conditions. The samples are then exposed to cycles of high humidity (75% RH for 8 h) then a cycle of low relative humidity (33% RH for 16 h). Samples are weighed at regular intervals with an accurate laboratory scale to 0.01 g. After two stable cycles, the samnles left the climatic chamber.

$$MBV = \frac{\Delta m}{S \times \Delta\ \%\ RH}$$

where Δm is the change in mass of the sample due to the change in relative humidity, S is the total exposure surface area, and Δ% RH is the difference between humidity levels.

Comparison of the Construction Binders According to the Invention to the Known Construction Binders Table 2 below shows, for different types of construction binders, known formulations and a formulation according to the invention. The mass of the components relating to each formulation is expressed as a percentage of the total mass of the construction binder (dry weight).

TABLE 2

| | Binder CEM1 (Reference) | MUP1 | MUP0 | MUP-Y1 | MUP-Y0 | MUP-Y2 |
|---|---|---|---|---|---|---|
| Raw clay matrix | 0.0% | 20% Smectite | 10% Smectite/ 10% Kaolinite | 40% Smectite | 39% Kaolinite | 41% Smectite/ Kaolinite 50/50 |
| Deflocculating agent | 0.0% | 1.0% | 1.0% | 1.5% | 2% | 1.5% |
| Activation composition | 0.0% | 18.0% | 18.0% | 23.5% | 23% | 23.5% |
| Metakaolin | 0.0% | 0.0% | 0.0% | 0% | 0% | 0% |
| Cement CEM1 | 100.0% | 0.0% | 0.0% | 0% | 0% | 0% |
| Composition of metal oxides | 0.0% | 62.0% | 62.0% | 35% | 36% | 34% |
| Compressive strength (MPa) at 28 days | 45 | 39 | 45 | 14 | 19 | 17 |
| MBV | 0.41 | 0.88 | 0.72 | 1.4 | 0.69 | 1.3 |
| Estimated Carbon Footprint | Strong | Weak | Weak | Weak | Weak | Weak |

Thus, Table 2 presents the mechanical strength of a known construction binder (binder CEM1) and not forming part of the invention, such as the CEM1 type construction binder better known under the name of "Portland" cement, of which the compressive strength is of the order of 45 MPa. It also presents the calculated moisture buffer values (MBV=0.41) for these construction materials of the prior art.

Table 2 also presents a formulation MUP1 according to the invention. It is important to note that this formulation including 1% of deflocculating agent, although including a small proportion of raw clay matrix (20%), has an identical mechanical resistance similar to the mechanical resistance of Portland cement but much higher hygrometric properties (MBV=0.88).

Furthermore, while MUP1 including 20% by weight of Smectite has an MBV greater than 0.75 (0.88), MUP0 including 10% by weight of smectite and 10% by weight of kaolinite, has an MBV below the limit of 0.75.

Similarly, MUP-Y0 including approximately 40% kaolinite does not allow an MBV value greater than or equal to 0.75 to be reached, whereas MUP-Y1 including approximately 40% smectite allows an MBV value of 1.4 to be reached.

Thus, clays of the smectite family are very advantageous for the preparation of construction materials having moisture buffering capacities capable of improving the comfort of the inhabitants by thermal and moisture regulation.

Table 2 also shows that a mixture of clay (MUP-Y2) such as a 50/50 mixture of Smectite and Kaolinite allows to greatly improve the moisture buffering capacities (MBV=1.3) while having high compressive strength.

On the Inefficiency of Adding Raw Clay to a CEM1

Table 3 below presents a known formulation of Cement CEM1-X1 to which a deflocculating agent has been added and five cement formulations to which clay CEM1-X2, CEM1-X3, CEM1-X4 and CEM1-X5 have been added, in different proportions.

TABLE 3

| | CEM1-X1 | CEM1-X2 | CEM1-X3 | CEM1-X4 | CEM1-X5 |
|---|---|---|---|---|---|
| Raw clay matrix | 0% | 20% | 40% | 60% | 80% |
| Deflocculating agent | 3% | 3% | 3% | 3% | 3% |
| Activation composition | 0% | 0% | 0% | 0% | 0% |
| Cement CEM1 | 97% | 77% | 57% | 37% | 17% |
| Compressive Strength (MPa) | 77 | 61 | 42 | 24 | 8 |
| MBV | 0.41 | 0.29 | 0.53 | 0.59 | 0.53 |

CEM1-X1 achieves very high mechanical strength but has an insufficient MBV (<0.75).

The addition of 20% raw clay induces, surprisingly, a reduction in the hygrometric properties of the construction material as well as a reduction in the mechanical resistance, even in the presence of a deflocculating agent.

It can be seen that from 40% of raw clay (CEM1-X3) in combination with Cement CEM1 and a deflocculating agent, that the MBV increases compared to CEM1-X1 but still remains insufficient (<0.75). Furthermore, the mechanical properties of the construction material CEM1-X5 are strongly affected until reaching insufficient levels (<10).

Thus, a combination of raw clay, of CEM1 and of a deflocculating agent does not allow to produce a binder that can have both satisfactory MBV and mechanical strength properties.

Importance of Blast Furnace Slag

Table 4 below presents a reference formulation MUPZ0, a formulation according to the invention MUPZ1 and a formulation according to the invention MUPZ2.

TABLE 4

| | MUPZ0 | MUPZ1 | MUPZ2 |
|---|---|---|---|
| Raw clay matrix | 57% Smectite | 59% Smectite | 43.5% Smectite |
| Deflocculating agent | 3% | 1% | 1.5% |
| Activation composition | 0% | 20% | 20% |
| Calcined metal oxide composition: Blast furnace slag | 0% | 20% | 35% |
| Cement CEM1 | 40% | 0% | 0% |
| Compressive Strength (MPa) | 28 | 12 | 26 |
| MBV | 0.59 | 1.35 | 1.9 |

Table 2 shows that the replacement of Portland cement by an activation composition and a calcined metal oxide composition (for example of the blast furnace slag type or ashes) allows for the compositions MUPZ1 and MUPZ2 to achieve MBVs much higher than 0.75.

Furthermore, the composition MUPZ2, which includes an organic deflocculating agent, has an MBV almost equal to 2 while having a compressive strength greater than 25 MPa.

The invention claimed is:

1. A construction binder comprising:

from 2% to 40% by dry weight of an alkaline activation composition;

at least 40% by weight of a raw clay matrix, the raw clay matrix comprising at least one raw clay from the smectite family; the at least one raw clay from the smectite family representing at least 20% by weight of the construction binder;

at least 20% by weight of a calcined metal oxide composition;

less than 15% by weight of Portland cement, and a deflocculation agent.

2. The construction binder according to claim 1, wherein the raw clay matrix includes a mixture of at least two types of clay.

3. The construction binder according to claim 1, wherein the raw clay matrix includes at least one clay having a specific surface at least equal to 100 $m^2/g$ as measured according to standard NFP 94-068.

4. The construction binder according to claim 1, wherein the alkaline activation composition includes at least 40% by weight of at least one metal oxide corresponding to an oxide of a metal having at least two valence electrons.

5. The construction binder according to claim 1, wherein the deflocculation agent is an organic compound.

6. The construction binder according to claim 1, comprising excavated earth including the raw clay matrix.

7. A construction material formed from the construction binder according to claim 1, including:

at least 2% by weight of at least one raw clay from the smectite family, less than 3.75% by weight of Portland cement, and having a moisture buffer value measured no earlier than 10 days after manufacture greater than or equal to 0.75.

8. The construction material according to claim 7, comprising at least two raw clays.

9. The construction material according to claim 7, comprising at least 5% by weight of at least one metal oxide corresponding to an oxide of a metal having at least two valence electrons.

10. The construction material according to claim 7, wherein it has a minimum resistance to compression on cylinders at 1 day as measured by standard NF EN 206-1 greater than or equal to 2 MPa.

11. A prefabricated element formed from the construction binder according to claim 1, said prefabricated element:

having a face with a surface area of at least 1 $m^2$ and a thickness between 0.3 cm and 20 cm;

including at least 5% by weight of at least one raw clay from the smectite family, including less than 3.75% by weight of Portland cement and having a moisture buffer value, measured no earlier than 10 days after manufacture, greater than or equal to 0.75.

12. A method for producing a prefabrication element, said method comprising:

Providing a construction binder comprising a raw clay matrix including at least one raw clay from the smectite family, a deflocculation agent, a calcined metal oxide composition, and an alkaline activation composition; the construction binder comprising from 2% to 40% by dry weight of the alkaline activation composition; the construction binder comprising at least 20% by weight of the calcined metal oxide composition; the at least one raw clay from the smectite family representing at least 20% by weight of the construction binder; and the construction binder comprising less than 15% by weight of Portland cement, Mixing the construction binder with granulates and water, and curing the mixture including a heat treatment at a temperature less than or equal to 100° C. for between 2 hours and 23 hours.

13. The method for producing a prefabrication element according to claim 12, wherein the raw clay matrix includes a mixture of at least two types of clay.

14. The method for producing a prefabrication element according to claim 12, wherein the raw clay matrix includes at least one clay having a specific surface at least equal to 100 $m^2/g$.

15. The method for producing a prefabrication element according to claim 12, wherein the construction binder comprises at least 40% by weight of raw clay matrix.

16. The method for producing a prefabrication element according to claim 12, wherein the construction binder includes at most 25% by dry weight of the alkaline activation composition.

17. The method for producing a prefabrication element according to claim 12, wherein the deflocculation agent is an organic compound.

18. The method for producing a prefabricated element according to claim 12, wherein the deflocculation agent represents at most 2% by weight of the construction binder.

* * * * *